Jan. 21, 1958     D. SILVERMAN     2,820,907
MICROFILM APPARATUS

Filed July 27, 1951                                3 Sheets—Sheet 1

INVENTOR.
Daniel Silverman

Jan. 21, 1958  D. SILVERMAN  2,820,907
MICROFILM APPARATUS

Filed July 27, 1951  3 Sheets-Sheet 3

INVENTOR.
Daniel Silverman

United States Patent Office 2,820,907
Patented Jan. 21, 1958

2,820,907

MICROFILM APPARATUS

Daniel Silverman, Tulsa, Okla.

Application July 27, 1951, Serial No. 238,922

8 Claims. (Cl. 250—204)

This invention relates to the general field of the control of machines by means of control spot representations or patterns on sheets or strips of material. It relates also to improvements in statistical machines, particularly such machines as are controlled by means of photographically recorded control spot representations of numerical data. It relates also to the fields of microfilm indexing and the use of photographically or mechanically impressed spot representations, by means of which such microfilm facsimiles are selected and displayed for viewing or duplication. This invention relates also to the general field of the storage of information and is directed to improvements in means for storing such information. In particular, this invention relates to improvements designed to make such control means more reliable and the control spot patterns of a smaller size, thereby permitting increased information storage capacity within a given volume of space.

All of these fields are related in that they require a previously prepared sheet or strip of paper or plastic or the like carrying an array of control spots or other identifiable characters arranged in such a manner as to carry specific information. When this array of characters is presented to an appropriate scanning system, and properly centered with respect thereto, the control spot pattern is converted into electrical or mechanical impulses which act to carry out the required operations. This invention is concerned not so much with the general procedure outlined above as with the manner in which the control spot pattern is accurately positioned with respect to the scanning system, and the manner in which reference guides are prepared and used in the positioning of the control spot pattern. In particular it concerns the character of the reference indicia by means of which the pattern is positioned, the manner in which the reference indicia are prepared, and the manner in which they are utilized.

With the great rate of increase of scientific knowledge the importance of improved means for storing such information in a form that occupies small space, and yet is easily located and made available, is clearly recognized. Much has been done in this connection, and the present state of the microfilm art is evidence thereof. In order to make the stored information readily available, use has been made of the techniques of punched card statistical machines for the purpose of indexing and selecting specific items of information.

In the prior art, control spot representations of mechanical, electrical, photoelectrical or other types have been used on sheets or strips of material such as paper, metal, plastic or the like, to cooperate with appropriate scanning means to control machines and to select for display or reproduction, cards, films, photographic facsimiles and the like. Reference means have been provided by means of which the control spot representations, or control spot patterns have been positioned in relation to their scanning means. These reference means have generally been the edges of strips or cards, or the edges of punched sprocket holes or the like. The natural variations in materials, the mechanical tolerances in the apparatus for punching the holes, the variations in size and shape of the positioning holes as they wear, the clearance that must be allowed for card or film movement through the control apparatus, etc., all contribute to a sizeable zone of error in the possible placement of the control spot pattern in the field of the scanning means. Since there are generally a multiplicity of columns and rows of spots in the control spot pattern, it is clear that the spacing between adjacent spots must be greater than the possible zone of error in the placement of the pattern. Thus to insure reliable operation the control spots must be of necessity spaced widely apart, and thus a large physical area of the strip or sheet must be utilized for the control spot pattern. In the case of microfilm strips or cards, for example, this means that more space must be used for control pattern and less for facsimiles.

It is thus an important object of my invention to provide an improved type of reference indicia which is not subject to loss of mutilation. It is also an object of this invention to provide improved reference indicia which are impressed upon the sheet or strip at the same time and in the same manner, from the same unitary structure as are the control spot representations, to the end that by simultaneously affixing the reference indicia and the control spot pattern on the sheet or strip, the possibility of error of placement of the control spot pattern with respect to the control spot scanning system is greatly reduced.

In my invention I provide as a preferred embodiment a system of reference indicia and a pattern of control spots that are all of the same general character so that they can be scanned by the same type of detecting apparatus, such as for example, by the use of optical beams and photoelectric detectors. By this means it is possible to use a small size of control spot pattern and to magnify by optical means, the entire array of reference and control spot characters, so that in the step of magnification they will hold their relative positions, and thus permit the use of physically rather large detecting apparatus. It is thus an important object of this invention to provide reference indicia and control spot patterns of substantially the same character, and of a character that can be magnified before being applied to the scanning system, whereby a great reduction is possible in the physical size of the index pattern and reference indicia. And since by this means the space required for the storage of a piece of information, such as a number, letter or other character can be reduced, it is an important object of this invention to provide an improved means for storage of information in reduced space.

Since a picture, such as for example, of a character printed in black ink on a sheet of white paper can be broken up into spots of black and white, such a character may constitute a control spot pattern. It is possible to print this character and simultaneously to print reference indicia, which might take the form of a border of a particular kind around the character, which does not affect its use for visual purposes, it is possible to scan printed material by optical means and convert the recorded spot pattern into signals for the control of printing or signalling means, or other machines, or to convert the signals into forms of audible or physical stimuli. It is therefore another object of this invention to provide improved means for examining printed or photographically recorded characters of a modified shape or pattern, whereby they can be scanned and the information contained in the characters converted into electrical or mechanical signals.

In order to facilitate an understanding of other and further objects and the principles of my invention, reference will be made to the several embodiments thereof illustrated in the accompanying drawings forming part of this application. Although specific language will be employed, it will nevertheless be understood that various further modifications of the devices illustrated herein, such as would fall within the province of those skilled in the art to construct are contemplated as part of the present invention. In the drawings.

Figure 7:
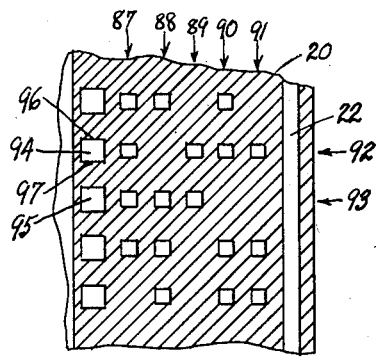
Figure 8:
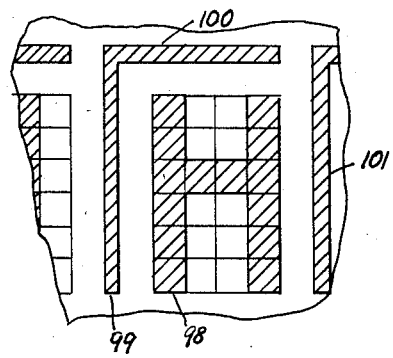

Figure 7 is an enlarged view of another type of statistical film record used for the storage of information, showing a different type of control spot pattern and reference indicia; and Figure 8 is an enlarged view of another type of information storage system employing conventional alphabetical characters, and utilizing reference indicia for positioning the character spot pattern with respect to the scanning means.

Figure 1:
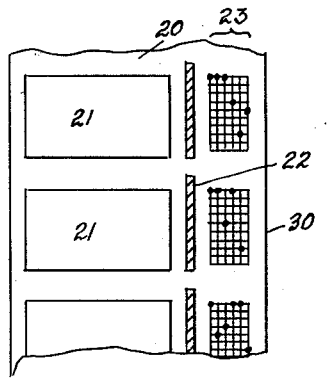
Figure 1 is an enlarged view of a transparent photographic film type of information storage, comprising facsimile reproductions, reference indicia, and control spot patterns.

Referring now to the drawings, and in particular to Figure 1, a strip of transparent photographic film is shown at 20. The designations on the film are divided into transverse sections, and each section contains certain component parts, 21, 22, and 23. In each section is an area 21 which might constitute a photographic facsimile of a document, drawing, or other piece of information. Part 22 represents a reference index character, containing reference edges or other characteristics required for positioning in two coodinates, the film 20, or an image of a part of the film. Part 23 comprises a multiplicity of control spots placed in a predetermined pattern of columns and rows on the transparent film.

This film could be part of a strip of microfilm, containing a series of photographic reproductions in miniature of information to be stored. The control spot pattern 23 might therefore be for the purpose of controlling a machine through which the film is being run, so that the spot pattern 23 is continuously compared with a previously set up pattern, representative of a particular facsimile, so that the machine will select that particular facsimile and stop the machine so as to expose it for examination, copying or other purpose. Microfilm records have been prepared utilizing a roll of photographic film and carrying photographic facsimiles and control spot patterns for the selection of particular facsimiles. However, in the prior art all of the forms of microfilm machines utilizing these parts have suffered from the limitation that the pattern of control characters to be scanned for their information is positioned for display before the scanning system by means of the positioning properties of sprockets and corresponding perforations in the film. Where the accuracy of placement of the pattern before the scanning means is not too critical, the use of sprockets and sprocket holes is fully satisfactory. However, it will be observed that in the manufacture of the sprockets themselves, the placement of the sprockets on the shafts of the machines, in the punching of the sprocket holes in the film, and in the wear of the positioning edges of the holes, there are tolerances which, when added together might provide a rather large zone of error in the placement of the film. It will be clear that this possible zone of error is important in the design of the control spot pattern. For example if the spacing of the rows and/or columns of the spots of the pattern is small compared with the maximum dimension of the zone of error, there is danger that a spot in one row or column of the pattern might be displayed in front of the scanning means in the position of another row or column, with resulting error in the indication. It is thus necessary that the spacing between rows and/or columns be larger than, and preferably several times larger than the maximum tolerances allowed in the placement of the control pattern in front of the scanning means.

The same situation exists in the case of control spot patterns operating by other means than photoelectric detection. For example, in the design of a punched card statistical machine in which the edges of the card are used as the reference indicia, certain tolerances must be allowed in the spacing of and the size of the punched perforations in the card so that with all the leeway possible in the placement of the card in the scanning machine there will be no chance of false indication. This condition places a requirement of large size on the control spot pattern. Furthermore, this condition cannot be obviated by magnification, for in that case the errors are magnified in the same ratio that the row and column spacings are magnified.

What is new in my invention over the conventional control spot patterns and scanning systems is the use of reference indicia which are printed, punched or otherwise impressed on the statistical or control sheet or strip simultaneously with the printing, punching or corresponding type of impression of the control spot pattern. The control pattern and the reference indicia thus constitute a composite array of characters which is created with extreme accuracy in the printing process, stays accurately together during subsequent use of the sheet in spite of handling and abuse, and can be impressed simultaneously on the scanning system, with or without magnification. It is obviously more practical to accurately construct a reference system and a control system together in the printing device and in the scanning device, than it is to position a multiplicity of statistical sheets in a scanning machine with the same precision of placement, particularly when the reference lines, holes or edges have become mutilated in use.

By the term "substantially simultaneously" which I use with reference to the marking of the spot pattern and the indicia on the statistical sheet, I means that the two arrays of characters are marked on the sheet in a time interval within which there is no movement of the sheet with respect to the marking apparatus. If between the time the indicia are printed on the sheet and the time the spot pattern is printed on the sheet it is moved in the printer, the high precision of placement of the pattern and the indicia with respect to each other is lost. On the other hand, so long as there is no movement of the sheet with respect to the printer, the time interval between the two printings can be as long as desired. It will be clear that to create, mark or print the indicia in one machine and then to move the sheet to another machine for printing the pattern is contrary to the principles of my invention.

Figure 4:
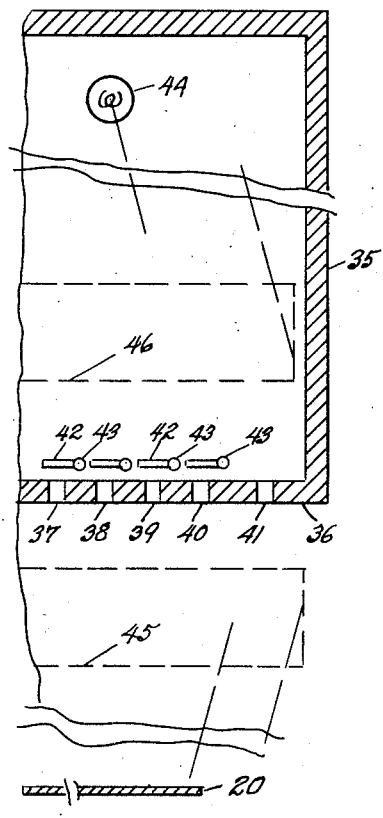
Figure 4 is a schematic drawing in horizontal section of one possible type of photographic printer for simultaneously printing reference indicia and control spot patterns on a photographic record strip.

One example of a printer for a photographic statistical film record, is shown in Figure 4. It is a structure 35 having a wall 36 on which are a multiplicity of openings 37, 38, 39 and 40 each accurately machined and positioned with respect to each other. There are as many openings arranged in rows and columns as the maximum number of rows and columns possible in the spot pattern. In Figure 4 I have shown a cross-section through one row of such openings. In the same wall are other openings representative of the reference indicia. These openings such as 41 are accurately machined and positioned with respect to each other and to the openings of the spot pattern. All of the pattern openings are covered with light tight masks 42 that are capable of being moved by control rods 43, relays, or similar means so as to expose the corresponding openings. In order to print a film record sheet the control spot pattern is first set up in the openings by turning and opening those masks required for the pattern. The masks over the other openings of the printer remain closed over their respective openings. The unexposed portion of the film 20 is presented to the openings on the wall or to an optical system, shown schematically as 45, which will provide an image, preferably reduced in size, of the pattern of openings. An optical system 46 cooperates with light source 44 to illuminate the openings 37, 38 etc. The light is energized for a time sufficient to expose the film, recording both the spot pattern and the indicia, after which the film is advanced to a new position.

This embodiment has been described only by way of example, and other equally satisfactory means may be devised, including the printing by a carbon surface from type, or by inked type directly onto a sheet of contrasting color and/or light reflectivity, or by the simultaneous punching of perforations in an opaque sheet, or still other ways.

Figure 2:
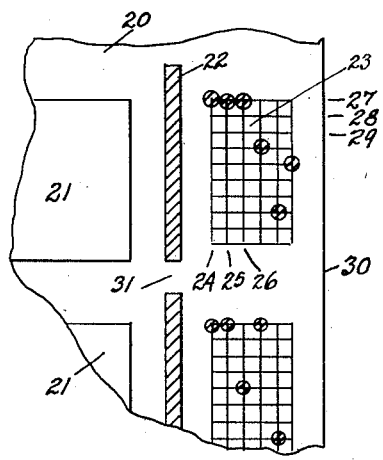
Figure 2 is a still further enlarged view of a portion of the transparent film record of Figure 1 for the purpose of describing more fully particular parts of the control spot pattern and the reference indicia.

As shown in Figure 2, the reference index 22 may consist of an opaque or transparent bar, rectangle or other shape of character, provided its edges or other reference portions are arranged perpendicular to the two coordinates of motion required in the placement of the control spot pattern before the scanning means. In Figure 2 the index 22 consists of two parts; a first area which is a longitudinal bar of constant width, and spaced accurately with respect to the columns of control spots 24, 25, 26, etc. This longitudinal bar 22 comprises the transverse index; and a second area designated as 31 between the ends of bars 22. This area 31 consists of a transparent horizontal bar of length equal to the width of 22. The two edges of this horizontal bar 31, which are the transverse edges of 22, serve to position the film in a longitudinal direction, or determine when the film is in a predetermined position. This second area 31 comprises the longitudinal index. In the photographic printing machine by means of which the spot pattern and the indicia are printed, a constant and accurate relationship must be provided between the edges of the bar 31 and the horizontal rows of the spot pattern 27, 28, 29, etc. Thus the printing machine, with an accurate construction of bars and spots in their relationship to each other is able to print patterns of spots and corresponding reference indicia in accurate physical alignment. Furthermore, the photographically recorded characters of bars and spots are not easily mutilated in use in any way that would affect their space relationship. This relationship is not altered if the entire array is optically magnified before being presented to the scanning system. This feature of magnification permits the use of photographically reduced printings, and serves to conserve space on the films, and thus provide for maximum storage of information in a minimum of space. Furthermore, although sprockets are useful in the handling of film, they are not essential, and since by the teachings of my invention they are not essential for the placement of the spot pattern, they can be eliminated and the space which they would normally occupy is saved and utilized for information storage.

As is well known in the art of statistical machines, there are two main systems of operation; in (a) the spot designations are presented in time sequence to detectors, and (b) an entire pattern or grouping is presented simultaneously to a detector system. The arrangement in Figure 2 is useful in the latter case. For the former type of operation it might be more desirable to provide a series of indicia 32, 33, 34, etc. as in Figure 3, one corresponding to each row 27, 28, 29, etc. respectively of the control spots. As was described in connection with Figure 2 the indicia of Figure 3 comprise two sets of areas; a series of first areas which comprise the rectangles 32, 33, 34, etc. which form the transverse indicia; and a series of second areas which form the longitudinal indicia, and which comprise the spaces between the rectangles 32, 33, 34, etc.

In the practice of my invention it is my intention to use most of the present day means for rough positioning of the pattern before the scanning system. Thus, with the use of cards or sheets it is desirable to set up maximum tolerances in dimensions, not only for the cards, but for the machines as well. However, dependence is not placed on these positioning means for the accurate placement of the pattern. The final accurate positioning is controlled by the reference indicia.

Figure 5:
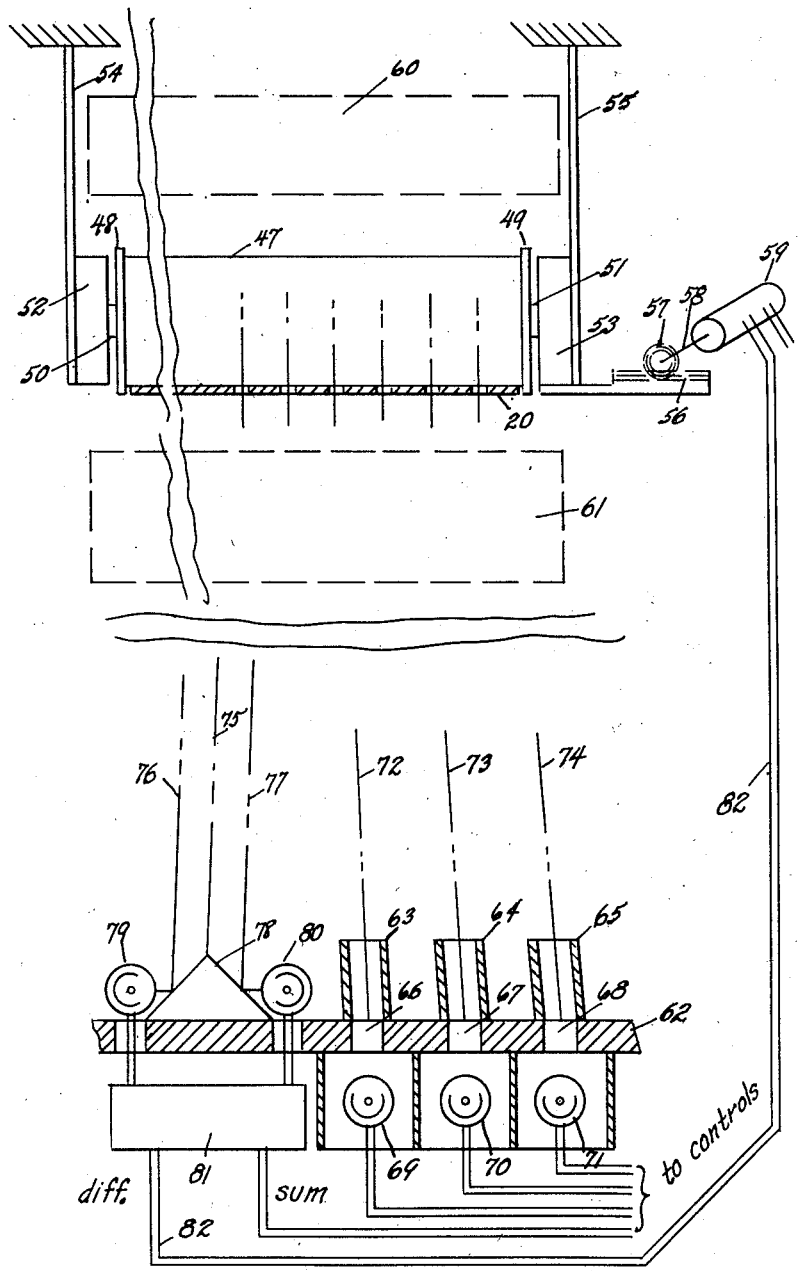
Figure 5 is a diagrammatic view of part of a statistical machine showing the means for controlling the position of the film, and thus the position of the control spot pattern with respect to the scanning system in accordance with the indications of the reference indicia.

In Figure 5 I have shown one method of doing this. This figure shows a horizontal cross section through a vertical strip of film 20, similar to that of Figure 1. The strip of film passes over the roller 47 which carries flanges 48 and 49. The roller turns freely by means of shafts 50 and 51 journaled in bearings 52 and 53. The roller 47 is mounted below the plane of scanning and a second roller, not shown, is placed above the plane of scanning. The pair of rollers allow for free movement of the film and accurate placement of the plane of the film.

The roller and bearing system is supported on two resilient arms 54 and 55 such that while vertical motion is prevented, a certain amount of side motion is permitted. Bearing 53 also carries a rack 56 and a cooperating pinion 57 is carried by shaft 58 of motor 59. By means of the motor 59 it is possible to move the roller structure and the film in a horizontal direction in order to maintain precise alignment of the pattern and the scanner.

A light source and input optical system shown diagrammatically as 60 irradiates the back of the film 20. The film carries a series of spot patterns which may be either opaque on a transparent field or vice versa. It also carries the corresponding reference indicia 22. Optical system 61 creates an image on the face of the opaque mask 62 of the pattern of light and dark areas on the film 20 as it passes in front of the optical system 61. This image comprises three parts or component images; a first image of the pattern 23, a second image of the longitudinal indicia which comprises the second areas of the indicia of Figures 2 and 3, and a third image of the transverse indicia which comprises the first areas of the indicia of Figures 2 and 3. The optical system 61 is shown as a magnifying one, and the image at 62 is larger than the spot pattern on the film itself. Light beams 72, 73, 74, etc. are shown schematically in the position of beams controlled by the transparent spots in the several columns of the control spot pattern. Each of these beams is directed into louvers 63, 64, 65, etc. respectively, which are placed colinear with openings 66, 67, 68, etc. respectively in the opaque mask 62. Behind the openings are photoelectric cells 69, 70, 71, etc. respectively, for detecting the beams 72, 73, 74, etc. whenever the spot pattern permits them to pass.

The beam 75 set up by the reference index bar 22 has edges 76 and 77. The beam 75 may be dark and the fringes bright, or vice versa, dependent upon whether the bar is opaque or transparent. Assume that in Figure 5 the bar is transparent and then 75 is a bright beam with edges 76 and 77. The beam is impressed on silvered prism 78 which splits the beam into two parts directed respectively to photoelectric cells 79 and 80. When the reference index bar 22 is in precise alignment with the optical system the amount of light falling on the two cells will be substantially equal. They are connected to the amplifier 81 where the difference between their respective output voltages is amplified and applied through leads 82 to the motor 59. If the light falling on each cell is the same, their outputs will be substantially equal and there will be no current in the leads 82. If more light falls on cell 79 for example, than on 80, a current will flow in the leads to the motor which will rotate in such a direction as to move the roller and the film in a direction to shift the beam 75 until equal light again falls on the two cells. This optical servo system moves the film until the reference bar is in its proper position with respect to the optical system 61. When this condition exists the beams 72, 73, 74, etc. will be directed into their corresponding louvers, openings and photoelectric cells, and there is no danger of their getting into adjacent optical channels.

So far I have shown an optical servo for controlling the transverse movement of a film, in order to align it accurately with the scanning system. It will be obvious that instead of a continuous strip or film being used, a card or other separate sheet might be positioned between the optical systems 60 and 61, and the same type of optical servo, or equivalent means, utilized for positioning the control spot characters accurately before the scanning system. In the case of cards or other form of separate sheets, it is clear that a similar type of servo can also be used to move the card in a direction at right angles to the plane of the drawing of Figure 5. However, instead of positioning the strip film of Figure 5 in a longitudinal direction (that is, perpendicular to the plane of the drawing) it is possible to move the film in accordance with the driving system, and by means of relays controlled by the index bars 22 cause the detecting system to operate at the precise time that the film is in proper register with the scanning system, and thus also with the control spot scanning system.

Figure 3:
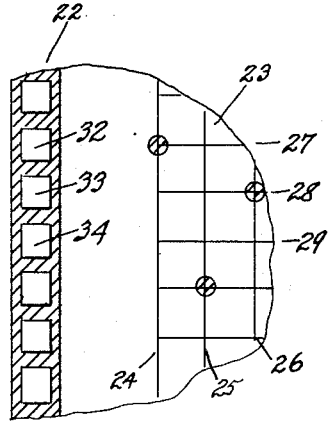
Figure 3 is an enlarged portion of another type of transparent film statistical record employing another type of reference indicia.

For example, in the case shown in Figure 5 the transverse servo system operates on the longitudinal edges of the bars 32, 33, etc. of Figure 3 by utilizing the differences between the outputs of the two cells 79 and 80. If the transverse servo system is in proper register the differences in amount of light falling on the two photoelectric cells is substantially zero. At the same time the sum of the amounts of light falling on the cells will not be constant, but will vary as the rectangles 32, 33, etc. of Figure 3 pass before the optical system. A horizontal mask should be provided either in the optical system or at the mask 62, to limit the vertical extent of the images of the bars 32, 33, etc. The width of the mask at the film may, for example, be equal to the length of the rectangles. In this case the sum of the outputs of the two cells will show an increase as the edge of the transparent rectangle comes past the edge of the mask, up to a maximum when the rectangle is centered in the mask, and will decrease again to a minimum. It will be clear that the sum current from the amplifier 81 can be used in conjunction with derivative circuits and other devices, well known in the art to control an amplifier or to close a relay at the instant when the rectangle 32 is centered in the mask 62. The action of this relay and those connected to the photoelectric cells 69, 70, 71, etc. will serve to control the machine, or perform any other operation desired.

Figure 6:
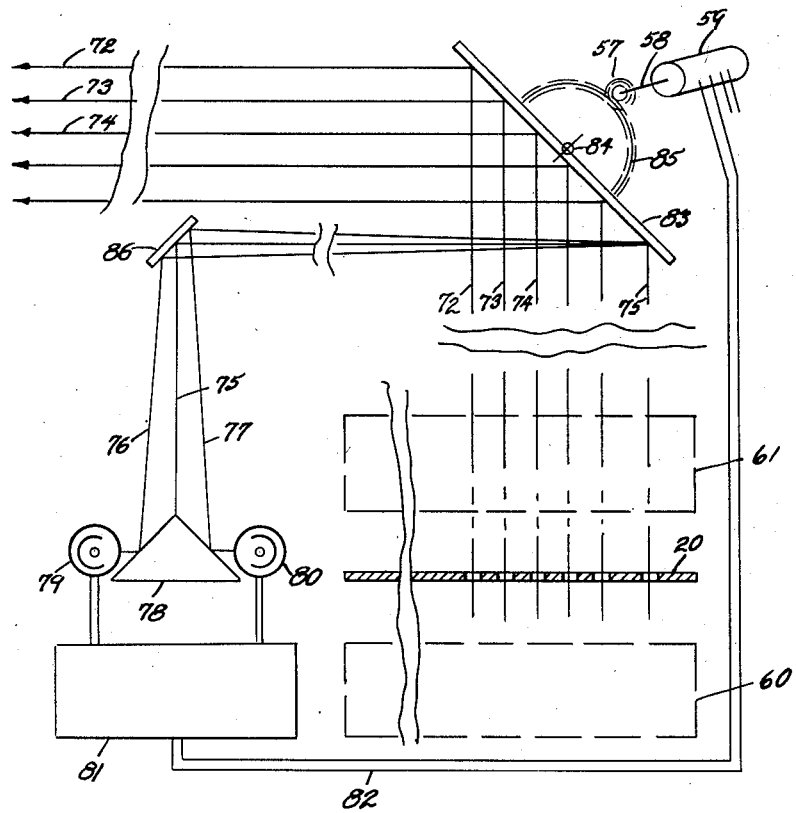
Figure 6 is a diagrammatic view of part of a statistical machine employing photoelectric detection of the reference indicia in which the image of the pattern of control spot representations is positioned with respect to the scanning means in accordance with the indications of the reference indicia, without moving the film.

While the system for positioning of the card or film indicated and described in connection with Figure 5 can be used whatever the manner of scanning the index pattern, it will be clear that so long as the scanning is photoelectric, it is possible to position the pattern, as represented by an image of the film, by operating on the image, or the beams of light, rather than on the film itself. This case is shown in Figure 6 which represents a schematic plan view of the apparatus. As in Figure 5, I have shown a horizontal cross section of the vertical film 20 (without the roller and associated transporting mechanism) and optical systems represented schematically as 60 and 61. The light beams 72, 73, 74, etc. and the index beam 75 are directed to a mirror 83 which is capable of rotation about vertical axis 84. Gear sector 85 mounted about the axis 84 cooperates with pinion 57 mounted on shaft 58 of motor 59. After reflection from mirror 83 the beams 72, 73, 74, etc. are directed to louvers, openings, and photoelectric cells not shown, but similar to those in Figure 5. The beam 75 with edges 76 and 77 is directed to a stationary mirror 86 and thence to the silvered prism 78 and photoelectric cells 79 and 80, as in Figure 5. The method of operation of the system of Figure 6 is substantially as described in connection with that of Figure 5, except that the mirror 83 is rotated about its axis by the motor 59 to position the beams 72, 73, 74, etc. in exact alignment with their louvers. This principle of the alignment of the optical image of the film or card may be used in two coordinates to precisely register the pattern with the appropriate scanning system.

In Figures 1 and 2 I have shown control spot patterns comprising a multiplicity of characters arranged in rows and columns. One possible arrangement is in columns of 10 rows, to form a decimal system. Another method of indexing comprises the use of a code of any number of characters, each different combination of characters representing a different datum. For example the five element code used on the teletype printing system can, by use of various combinations of the five elements, designate a wide variety of characters, such as letters, numbers, etc. If it were desired, by means of my invention to store a large quantity of information in a form in which it could be quickly reconverted automatically to another form, it would be possible to provide photographic facsimiles of the various combinations of the five characters printed simultaneously with reference indicia. These could be photographically recorded in minute size. Then when the information is once again required, the pattern of characters and the reference indicia could be magnified and scanned by appropriate means. In Figure 7 I have shown a form in which the pattern could be laid out. On film sheet 20 are a multiplicity of rows 92, 93, etc. of spots arranged in five columns 87, 88, 89, 90 and 91 respectively. In each row various combinations of the spots are present. At one side is a reference bar 22 printed photographically at the same time that the spot pattern is printed. Also other indicia 94, 95, etc. are provided with edges 96, 97, etc. which serve, in cooperation with an appropriate servo system to position the pattern in a longitudinal direction. This is a variation of the form of reference indicia shown in Figures 2 and 3. Other forms may be devised without departing from the spirit of my invention. It will be seen that as the film 20 is traversed vertically past a scanning system, which might be similar to that of Figure 5 or Figure 6, the images of the characters in each row will be positioned accurately in front of their respective detectors by means of the reference bar 22 and the cooperating photoelectric servo. When the images of the pattern are accurately centered in their detectors the indicium 94, for example, will be in the center of its detector and will prepare the pattern scanning system to operate by closing its relay. At this instant the outputs of the five detectors, responsive to each of the five columns respectively will be permitted to control whatever operation that may be desired, such as printing the characters corresponding to that particular pattern, or other operation.

It is not necessary that the control spot pattern be one made up of discrete spots such as those indicated in Figures 1 and 7. Any arrangement of light and dark areas or other contrasts in character, subject to detection by physical means, can be used. For example a printed letter or other character might be detected and "read" by the method of my invention, if in the printing of that particular character reference indicia are provided for the accurate alignment of the image of that character on a scanning system.

In Figure 8 I have shown a character 98 which for example may be a letter "H." The area of the character is broken down into a pattern of units, which for convenience might be squares or circles, and for example, might be arranged in four columns of six rows each forming a set of twenty-four elements. Spaced on two sides of the area represented by the character are reference lines 99 on one side and 100 along the top. The line 101 does not belong to this character, but is the indicium of the adjacent character to the right. The indicium 100 may be a continuous band if desired, instead of being interrupted at each character as shown. By means previously described it will be clear that the indicia 99 and 100 will serve to position in two coordinates, the image of the character 98. If the positioning system has an associated scanning system containing the 24 elements arranged in the same form, it is possible to identify the character by the particular combination of detectors responding to the scanning. It is thus possible to convert the printed character into a pattern of electrical signals which can be used to identify the character. It is possible also to convert the signals into other forms, such as a printed indication, or sound or physical stimuli. For example, once the character is identified, it is possible to convert the electrical signals into a combination of spacially arranged probes, arranged in a pattern to indicate that particular specific character in the braille alphabet or some similar code. Thus it is possible for a blind person to have presented to his fingers an array of probes spaced in accordance with the braille designation of the specific character being scanned, or any other spacial arrangement of stimuli. In this way a blind person could read a printed page. If the control spot characters were represented in the form of Figure 7, while it would not be convenient for another person to read the sheet, it would store and make available the information in a form much simpler for the machine to scan and "read" than would the system shown in Figure 8.

While I have described and pointed out the fundamental novel features of my invention and have described it in connection with a number of modifications, it will be understood that various changes, substitutions, additions, and omissions in the form and detail of the devices illustrated and in their operation may be made by those skilled in the art without departing from the spirit of my invention. For example photoelectric scanning might be employed utilizing reflected light instead of transmitted light, or photoelectric scanning might be utilized in conjunction with light transmitted through perforations in an opaque sheet. It is my intention therefore to be limited only as indicated by the scope of the following claims.

I claim:

1. In a statistical machine adapted to utilize a statistical record sheet having a pattern of identifiable characters, longitudinal indicia and transverse indicia, each of said characters in said pattern and said indicia having one of a multiplicity of discrete optical properties and impressed on said sheet substantially simultaneously, the improvement comprising pattern scanning means comprising a multiplicity of optical detectors arranged in said pattern and responsive respectively to the optical properties of each of said characters, longitudinal indicia scanning means and transverse indicia scanning means, each of the same general character as said pattern scanning means, means for creating an optical image of said sheet, means for traversing said image in a longitudinal movement along said scanning means, means responsive to said transverse indicia scanning means for positioning said image transverse to said longitudinal direction, and means responsive to said longitudinal indicia scanning means for determining when a predetermined relationship exists between said longitudinal indicia and said longitudinal indicia scanning means.

2. A statistical machine adapted to use a photographic record strip of the microfilm type, said strip including a pattern of identifiable characters and reference indicia, comprising longitudinal and transverse indicia, said pattern and said indicia being printed on said strip substantially simultaneously; said machine including strip transport means; means for illuminating said strip; optical means for forming and projecting an image of said illuminated strip including a first image of said pattern, a second image of said longitudinal indicia and a third image of said transverse indicia, means for traversing said image in a longitudinal direction, transverse indicia scanning means, pattern scanning means, positioning means responsive to said transverse indicia scanning means for positioning in a transverse direction said first image with respect to said pattern scanning means, said pattern scanning means comprising a multiplicity of optical detectors arranged in said pattern and responsive respectively to the optical properties of each of said characters longitudinal indicia scanning means and means responsive to said longitudinal indicia scanning means for determining when a predetermined relationship exists between said second image and said longitudinal indicia scanning means.

3. Apparatus as in claim 2 in which said optical means includes optical magnification.

4. Apparatus as in claim 2 in which said optical means includes light deflecting means capable of moving said first, said second and said third images with respect to said pattern scanning means and said indicia scanning means respectively, without relative movement of said three images with respect to each other.

5. In the method of making a sortable photographic film record of the microfilm type in which an identifiable pattern of similar characters is printed in association with photographic reproductions on said record, the improvement which comprises the step of printing scanning guide indicia on said record in association with and substantially simultaneously with the printing of said pattern of characters.

6. In a statistical machine adapted to scan a film strip of the microfilm type having reference indicia comprising transverse and longitudinal indicia, the improvement comprising, a scanning system comprising transverse indicia scanning means and longitudinal indicia scanning means, means for forming and projecting on said scanning system an optical image of said reference indicia, means for transporting said strip through said machine in such a manner that said image is traversed longitudinally past said scanning system, a servo system responsive to said transverse indicia scanning means, said servo system including motor means which control the transverse position of said strip, and means responsive to said longitudinal indicia scanning means for determining the time when a predetermined relaitonship exists between said longitudinal indicia scanning means and the image of said longitudinal indicia.

7. In a statistical machine adapted to scan a film strip of the microfilm type having reference indicia comprising transverse and longitudinal indicia, the improvement comprising a scanning system comprising transverse indicia scanning means and longitudinal indicia scanning means, means for forming and projecting on said scanning system an optical image of said reference indicia, means for transporting said strip through said machine in such a manner that said image is traversed longitudinally past said scanning system, a servo system responsive to said transverse indicia scanning means, said servo system including motor means which control the transverse position of said image by rotation of an optical element in said means for forming and projecting an optical image, and means responsive to said longitudinal indicia scanning means for determining the time when a predetermined relationship exists between said longitudinal indicia scanning means and the image of said longitudinal indicia.

8. In a statistical system, a photographic record strip of the microfilm type having reference indicia, for use in a statistical machine having a scanning system for said reference indicia, said record strip comprising a photographic film strip on which are impressed photographically microphotographs of information to be stored on said film and reference indicia comprising a pattern of identifiable characters, longitudinal indicia and transverse indicia, each of said characters in said pattern and said indicia having one of a multiplicity of discrete optical properties and impressed on said strip substantially simultaneously, substantially the entire area of said strip being occupied by said microphotographs and said reference indicia.

References Cited in the file of this patent

UNITED STATES PATENTS

| | | |
|---|---|---|
| 1,822,902 | Osborne | Sept. 15, 1931 |
| 1,838,389 | Goldberg | Dec. 29, 1931 |
| 1,853,443 | Maul | Apr. 12, 1932 |
| 2,011,932 | Ives | Aug. 20, 1935 |
| 2,250,209 | Shoults | July 22, 1941 |
| 2,268,499 | Bryce | Dec. 30, 1941 |
| 2,282,029 | Bryce | May 5, 1942 |
| 2,294,734 | Bryce | Sept. 1, 1942 |
| 2,358,051 | Broido | Sept. 12, 1944 |
| 2,557,022 | Wolowitz | June 12, 1951 |
| 2,563,892 | Waller et al. | Aug. 14, 1951 |
| 2,666,356 | Graham et al. | Jan. 19, 1954 |